(12) United States Patent
Nakai et al.

(10) Patent No.: US 6,906,620 B2
(45) Date of Patent: Jun. 14, 2005

(54) OBSTACLE DETECTION DEVICE AND METHOD THEREFOR

(75) Inventors: Hiroaki Nakai, Kanagawa (JP); Hiroshi Hattori, Tokyo (JP); Nobuyuki Takeda, Kanagawa (JP); Kazunori Onoguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 109 days.

(21) Appl. No.: 10/649,939

(22) Filed: Aug. 28, 2003

(65) Prior Publication Data

US 2004/0096082 A1 May 20, 2004

(30) Foreign Application Priority Data

Aug. 28, 2002 (JP) ...................................... 2002-249782

(51) Int. Cl.[7] ................................................. G06K 9/00

(52) U.S. Cl. ..................... 340/435; 340/937; 340/436; 382/104; 382/103; 701/45

(58) Field of Search ............................... 340/435, 937, 340/436, 903; 382/104, 103, 154; 348/148, 119, 149; 701/45, 301

(56) References Cited

U.S. PATENT DOCUMENTS

| | | | | |
|---|---|---|---|---|
| 5,020,114 A | * | 5/1991 | Fujioka et al. | 382/44 |
| 5,307,136 A | * | 4/1994 | Saneyoshi | 356/1 |
| 5,892,855 A | * | 4/1999 | Kakinami et al. | 382/291 |
| 6,477,260 B1 | * | 11/2002 | Shimomura | 382/106 |
| 6,487,303 B1 | * | 11/2002 | Yamaguchi et al. | 382/103 |
| 6,535,114 B1 | * | 3/2003 | Suzuki et al. | 340/435 |
| 6,744,380 B2 | * | 6/2004 | Imanishi et al. | 340/937 |
| 6,801,244 B2 | * | 10/2004 | Takeda et al. | 348/119 |
| 2002/0191837 A1 | | 12/2002 | Takeda et al. | 382/154 |

FOREIGN PATENT DOCUMENTS

| | | |
|---|---|---|
| JP | 2000-293693 | 10/2000 |
| JP | 2001-76128 | 3/2001 |
| JP | 2002-352225 | 12/2002 |

OTHER PUBLICATIONS

Hiroshi Hattori et al., "Stereo Without Depth Search and Metric Calibration", Proceedings of IEEE Computer Society Conference on Computer Vision and Pattern Recognition, CVPR 2000, pp 177–184 (2000).

* cited by examiner

*Primary Examiner*—Daniel Wu
*Assistant Examiner*—Sihong Huang
(74) *Attorney, Agent, or Firm*—Finnegan, Henderson, Farabow, Garrett & Dunner, L.L.P.

(57) ABSTRACT

Provided is a technology for helping safe driving and realizing automatic driving of vehicles, or for counting the number of passing vehicles on the road or monitoring those passing vehicles for their driving. Using a plurality of cameras mounted in a vehicle or provided above a road, even if the relationship between the road plane and the respective cameras constantly changes in relative position or posture due to camera vibration or a change in road tilt, any obstacles located on the road such as other vehicles ahead, parked vehicles, and pedestrians on the road are detected without confusing those with textures including white lines, road signs, paint, road stains, and shadows of roadside objects, all of which do not disturb vehicle driving. An obstacle detection device 10 is structured by an image input section 11 for receiving images from a plurality of image pick-up devices 101, a correspondence detection section 12 for finding a plurality of pairs of corresponding points from the received right and left images, the slope degree calculation section 13 for calculating a slope degree of a plane including the corresponding points, and a result determination section 14 for determining as there being an obstacle when the calculated slope degree is larger than a predetermined value.

17 Claims, 14 Drawing Sheets

FIG. 6
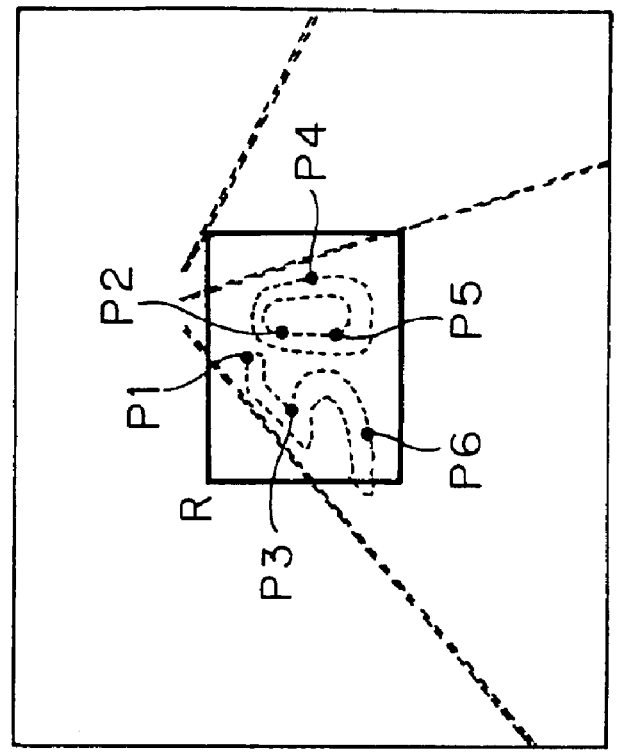
RIGHT IMAGE
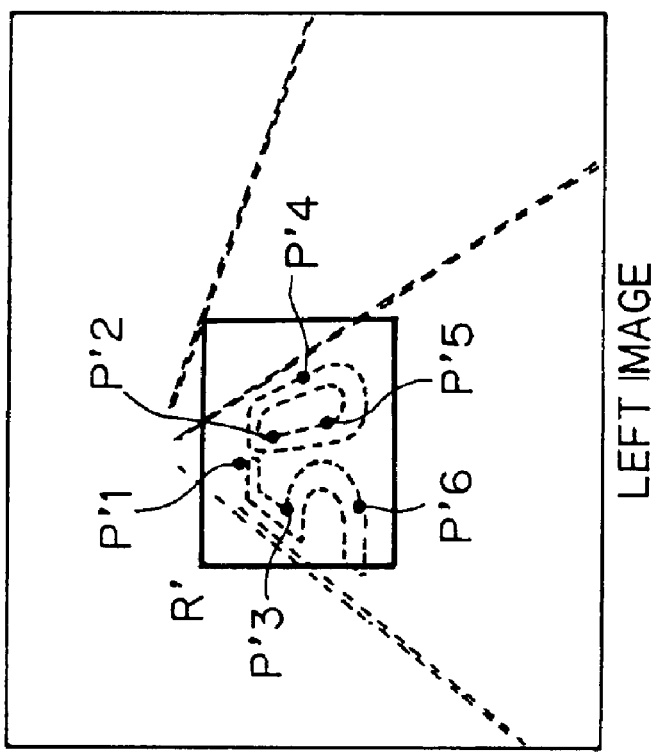
LEFT IMAGE

FIG. 7
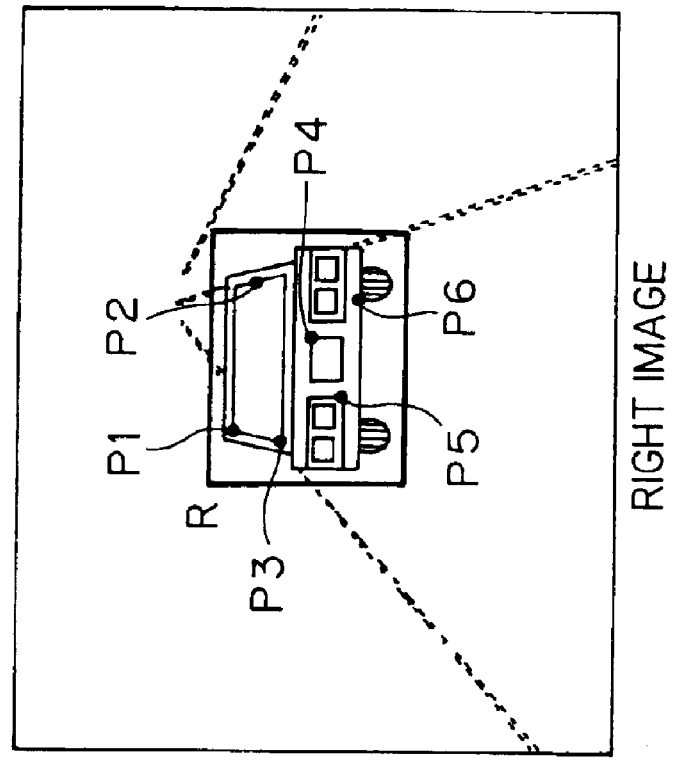
RIGHT IMAGE
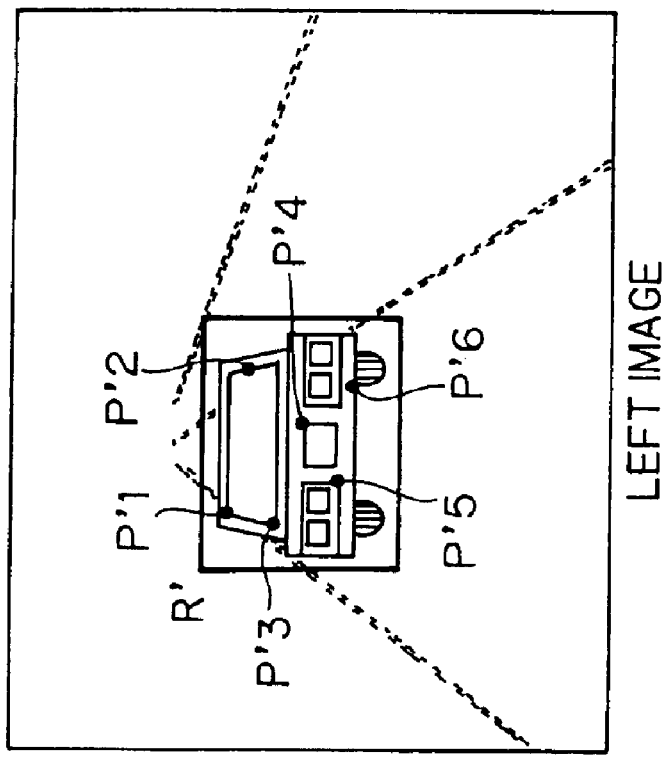
LEFT IMAGE

FIG. 13
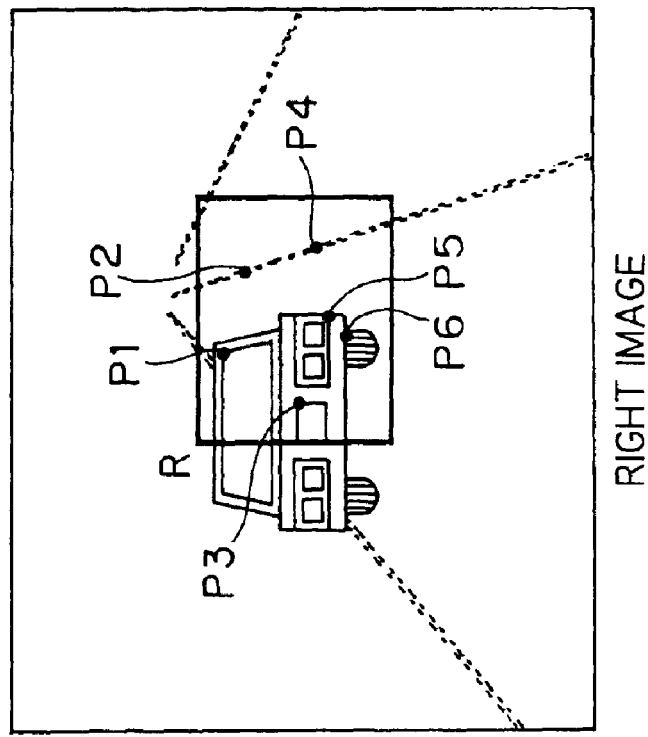
RIGHT IMAGE
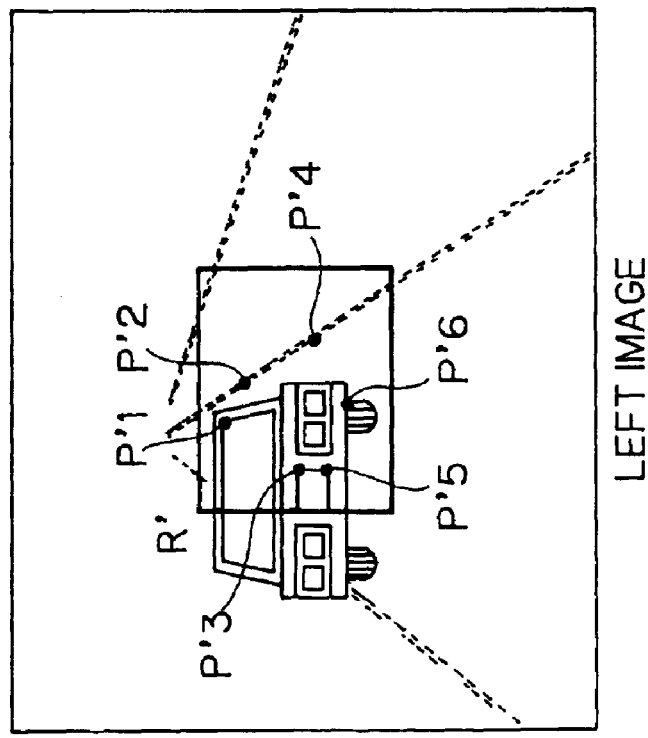
LEFT IMAGE

OBSTACLE DETECTION DEVICE AND METHOD THEREFOR

CROSS-REFERENCE TO RELATED APPLICATIONS

This application is based upon and claims the benefit of priority from the prior Japanese Patent Application No.2002-249782, filed on 28 Aug. 2002; the entire contents of which are incorporated herein by reference.

BACKGROUND OF THE INVENTION

1. Field of the Invention

The present invention relates to an obstacle detection device for detecting any obstacles on a road without confusing those with textures using a plurality of cameras mounted in a vehicle or provided above the road, and a method applied to the device. Here, the obstacles are those located on the road such as other vehicles ahead, parked vehicles, and pedestrians. The textures include white lines, road signs, paint, road stains, and shadows of roadside objects, all of which do not disturb vehicle driving. The cameras are provided mainly for helping safe driving and realizing automatic driving of the vehicle, or for counting the number of passing vehicles on the road or monitoring those passing vehicles for their driving. Obstacle detection is possible even if the relationship between the road plane and the respective cameras constantly changes in relative position or posture due to camera vibration or a change in road tilt, for example.

2. Description of the Background Art

A method for detecting any obstacles on roads is classified into two types: one is a type using active sensors typified by sonars, radars, and range finders; and the other is a type using passive sensors typified by visible-light CCD cameras and infrared cameras.

The active sensors are popular for measuring object positions in various applications, and well known for their usability. The active sensors have, however, problems for an application of detecting any obstacles lying in the vehicles' way on the roads such as other vehicles. Specifically, the problems are associated with low detection resolution, not enough measurement range, erroneous detection of non-obstacles on the roads, and erroneous detection of objects lying on non-disturbing road side due to no driving lane detection capability. Thus, there has been a demand for an advanced obstacle detection technology by image analysis using the passive sensors exemplified by CCD cameras.

To detect obstacles lying on road surfaces through analysis of images provided exemplarily by CCD cameras mounted in vehicles, generally utilized is information about image brightness intensity pattern or driving lanes recognized for the purpose. As for detecting the driving lanes, cutting out parts in shades of gray with less texture will do from images picked up by a camera.

The issue here is that, many obstacles are actually similar to roads in brightness intensity or pattern, resulting in difficulty achieving the higher usability with the less erroneous detection.

There is another type of method using a plurality of cameras for detecting obstacles and driving lanes. Such a method is generally called a stereoscopic method.

With stereoscopic views, three-dimensional (3D) information about a target detection region can be derived on the triangulation principle. Thus, stereoscopic views seem to be a solution for obstacle and lane detection with higher accuracy, but still bear problems. For example, a corresponding point search cannot be uniquely solved, and the calculation cost is quite expensive. This corresponding point search is done to find any specific point(s) in real world shared by a plurality of camera images.

In this respect, methods disclosed in Patent Literature 1 (JP-A-2000-293693) and Patent Literature 2 (JP-A-2001-76128) do not require such a corresponding point search, and are considered useful for obstacle detection. These methods are described in the below.

Assuming now that two cameras, right and left, are provided to pick up images of a road. Project points as a result of projecting points on the road plane onto images picked up by the right and left cameras are presumably (u, v) and (u', v'), and a relational expression 1 is established as follows:

$$u' = \frac{h_{11}u + h_{12}v + h_{13}}{h_{31}u + h_{32}v + h_{33}}, \quad (1)$$

$$v' = \frac{h_{21}u + h_{22}v + h_{23}}{h_{31}u + h_{32}v + h_{33}}$$

$$h = (h_{11}, h_{12}, h_{13}, h_{21}, h_{22}, h_{23}, h_{31}, h_{32}, h_{33}) \quad (2)$$

The equation 2 shows a parameter dependent on the positions and postures of the right and left cameras with respect to the road plane, lens focal distances of the cameras, points of origin of the images, and the like. The parameter h can be derived in advance only by project points $(u_i, v_i)$ and $(u_i', v_i')$ (i=1, 2, ..., N), which are those derived by projecting four or more points on the road plane onto the right and left images. Using such a relational expression, a corresponding point P'(u', v') on the left image is derived based on the assumption that an arbitrary point P(u, v) on the right image is located on the road plane. If the point P is truly located on the road plane, the points P and P' are paired as the correct corresponding points, leading to a good match between two pixels or neighboring regions in terms of brightness intensity or feature. On the other hand, if the points P and P' differ in brightness intensity, the point P is determined as belonging to an obstacle region. This method allows for determining whether an arbitrary point in the image has a height from the road plane directly only from the relational expression 1. There is thus no need for the corresponding point search between the right and left images.

To apply such a scheme for obstacle detection in front of the vehicle, the parameter h is presumed as roughly constant when the vehicle is driving on rather flat road at low speed. Thus, there is no need to calculate the parameter h twice for correct obstacle detection.

Here, as to correspondence detection, the operation of a section provided therefor is described by referring to FIGS. 3 to 5.

The correspondence detection section operates to convert a first image picked up by a first image pick-up device into an image viewed from a viewpoint of a second image pick-up device. A parameter used for this conversion is so calculated as to keep a typical geometric relationship between a plurality of image pick-up devices and the road plane, with a presumption that the vehicle is standing still on the no-tilting road plane. The parameter is not calculated twice, and not changed during obstacle detection, e.g., when the vehicle is moving.

The parameter is calculated in a manner based on the Patent Literature 1, and described in the below.

Referring to FIG. 3, two cameras a and b are set up. The road surface has two parallel white lines 1 and 1' extending roughly along the optical axes of the cameras. The obstacle detection device is not notified of the relationship between the two cameras a and b in position and posture, but only of epipolar constraint. During when the obstacle detection device is in operation, no change occurs, presumably, to the relative positions and postures of the cameras a and b, and epipolar constraint. Here, the epipolar constraint means a constraint condition for stereoscopic images of a general type. Under this condition, as shown in FIG. 4, the arbitrary point P on the image (right image) picked up by the camera a is so constrained as to be on a predetermined linear line including the corresponding point P' on the image (left image) picked up by the camera b. This linear line is referred to as an epipolar line. As an example, when the optical axes of the cameras are so placed as to be parallel to each other, the corresponding point of the arbitrary point P in the right image is found on the same scanning line on the right image. Accordingly, the epipolar line agrees with the scanning line. The epipolar constraint is dependent on the relationship between the stereoscopic cameras in relative position and posture, and internal parameters of the cameras, e.g., lens focal distance, origin point of images. Thus, the epipolar constraint being invariant means the relative positional relationship between the stereoscopic cameras and their internal parameters showing no change (during when the obstacle detection device is in operation or the vehicle having the device mounted therein is moving). This epipolar constraint is formulated as the following equation 3.

$$(u, v, 1) F (u', v', 1)^T = 0 \qquad (3)$$

Herein, (u, v) is the arbitrary point P on the right image, and (u', v') is the corresponding point of the point P on the left image. F denotes a 3×3 matrix, and referred to as Fundamental matrix. Expanding the equation 3 will lead to the following equation 4.

$$(F_{11}u+F_{12}v+F_{13})u^1+(F_{21}u+F_{22}v+F_{23})v^1+(F_{31}u+F_{32}v+F_{33})=0 \qquad (4)$$

Herein, $F_{ji}$ (i, j=1, 2, 3) denotes an element of j row(s) and i column(s) of the matrix F, and can be derived from a plurality of corresponding points. Further, the equation 4 denotes an epipolar line corresponding to the point P(u, v) on the right image. Nine elements of the matrix F are not all independent, and theoretically, are derivable from seven corresponding points. Because 3D position is not required for each pair of the corresponding points, calculating the matrix F, i.e., the epipolar constraint, is rather easy. The lines 1 and 1' in each image are parallel three-dimensionally but not on the images picked up by the right and left cameras. As shown in FIG. 5, the lines 1 and 1' in each image cross each other at a point at infinity, which is called a vanishing point. Next, derived is a relationship established between the corresponding points on the road plane. As shown in the right image of FIG. 5, arbitrary points on the linear line 1 are $P_1$ and $P_3$, and arbitrary points on the linear line 1' are $P_2$ and $P_4$. For these four points, corresponding points $P_1'$, $P_2'$, $P_3'$, and $P_4'$ in the left image can be calculated using the epipolar constraint previously derived. That is, the point $P_1'$ correspond to the point $P_1$ agrees with an intersection point of the linear line 1 and the epipolar line $L_1$ of the point $P_1$ on the left image. Similarly, the points $P_2'$, $P_3'$, and $P_4'$ can be derived as intersections, respectively, of the epipolar lines $L_2$, $L_3$, and $L_4$ of the points $P_2$, $P_3$, and $P_4$, and the linear line 1 or 1'. Assuming that coordinates of the point $P_i$ (i=1, 2, 3, 4) are $(u_i, v_i)$, and coordinates of the point $Pi'$ (i=1, 2, 3, 4) are $(u_i', v_i')$. The relation between the coordinates $(u_i, v_i)$ and $(u_i', v_i')$ can be expressed by a relational expression 5.

$$u'_i = \frac{h_{11}u_i + h_{12}v_i + h_{13}}{h_{31}u_i + h_{32}v_i + h_{33}}, \qquad (5)$$

$$v'_i = \frac{h_{21}u_i + h_{22}v_i + h_{23}}{h_{31}u_i + h_{32}v_i + h_{33}} \quad (i = 1, 2, 3, 4)$$

These eight equations are solved using the following equation 6.

$$h=(h_{11},h_{12},h_{13},h_{21},h_{22},h_{23},h_{31},h_{32},h_{33}) \qquad (6)$$

If an arbitrary solution h satisfies the equation 5, a constant multiple kh of h (k is constant) also satisfies the equation 5. No generality is thus lost with $h_{33}=1$, and eight equations will lead to h composed of nine elements. By using such derived h, the corresponding point P'(u', v') on the right image can be calculated as the following equation 7 with an assumption that the arbitrary point P(u, v) on the left image is located on the road plane.

$$u' = \frac{h_{11}u + h_{12}v + h_{13}}{h_{31}u + h_{32}v + h_{33}}, \qquad (7)$$

$$v' = \frac{h_{21}u + h_{22}v + h_{23}}{h_{31}u + h_{32}v + h_{33}}$$

With the methods in Patent Literatures 1 and 2, when the vehicle drives on typical outside roads, the relationship between the road plane and the respective cameras continuously changes in relative position and posture due to vibrations occurring to the obstacle detection device, or a change in road tilt. Consequently, these methods bear such problems, due to vehicle vibration, as frequent erroneous detection especially around the texture on the road plane such as white lines, road signs, paint, road stains, shadows of roadside objects and vehicles, and the like.

As described above, with an obstacle detection device using CCD cameras of a conventional type, usage environment is limited, or the relationship between the road plane and the respective cameras continuously changes in relative position and posture due to vibrations during the device operation or driving vehicle. As a result, frequent erroneous detection occurs especially around the texture on the road plane such as white lines, road signs, paint, road stains, shadows, and the like, considerably lowering the true detection accuracy of obstacle detection.

The present invention is proposed in consideration of the above conventional problems, and an object thereof is to provide an obstacle detection device capable of correctly detecting only true obstacles no matter what road the device is set up, or no matter what road a vehicle having the device mounted therein is driving.

SUMMARY OF THE INVENTION

An embodiment of the present invention is an obstacle detection device in which at least two image pick-up devices each pick up an image of a preset common detection region, and which determines whether an obstacle is present or not in the detection region from stereo images picked up using the image pick-up devices. The device includes: image input means for receiving the image from each of the image pick-up devices; correspondence detection means for deriving a plurality of pairs of corresponding points in the detection regions of the received two stereo images; slope degree calculation means for calculating a slope degree corresponding to a slope angle between a basic plane which is parallel to optical axes of the image pick-up devices and a detection plane including the derived plurality of corresponding points in the stereo images; and result determination means for determining as there being an obstacle when the slope degree of the detection plane is larger than a predetermined value.

According to a second aspect, in the first aspect, the slope degree calculation means regards the slope angle as a pitch angle between the basic plane and the detection plane, and a parameter of an affine transformation matrix indicating a relationship between the corresponding points in the images or a unique value derived from the parameter as a slope degree.

According to a third aspect, in the first aspect, the slope degree calculation means calculates the slope degree by solving an equation based on a parallax and vertical positions of the plurality of pairs of corresponding points.

According to a fourth aspect, in the first aspect, the slope degree calculation means calculates the slope degree by voting coordinate values of the plurality of pairs of corresponding points into a voting space based on an equation satisfied by the coordinate values.

According to a fifth aspect, in the first aspect, the slope degree calculation means detects, as an obstacle, out of the plurality of pairs of corresponding points, only the pair of corresponding points resulting in the slope degree large in value.

An embodiment of the present invention is directed to an obstacle detection method in which at least two image pick-up devices each pickup an image of a preset common detection region, and which determines whether an obstacle is present or not in the detection region from stereo images picked up using the image pick-up device. The method includes: an image receiving step of receiving the image from each of the image pick-up devices; a correlation detecting step of deriving a plurality of pairs of corresponding points in the detection regions of the two stereo images; a slope degree calculating step of calculating a slope degree corresponding to a slope angle between a basic plane which is parallel to optical axes of the image pick-up devices and a detection plane including the derived plurality of corresponding points in the stereo images; and a result determining step of determining as there being an obstacle when the slope degree of the detection plane is larger than a predetermined value.

An embodiment of the present invention is a program for realizing, by computer execution, an obstacle detection method in which at least two image pick-up devices each pick up an image of a preset common detection region, and which determines whether an obstacle is present or not in the detection region from stereo images picked up using the image pick-up device. The program realizes: an image input function for receiving the image from each of the image pick-up devices; a correspondence detection function for deriving a plurality of pairs of corresponding points in the detection regions of the two stereo images; a slope degree calculation function for calculating a slope degree corresponding to a slope angle between a basic plane which is parallel to both of optical axes of the image pick-up devices and a detection plane including the derived plurality of corresponding points in the stereo images; and a result determination function for determining as there being an obstacle when the slope degree of the detection plane is larger than a predetermined value.

An embodiment of the present invention is an obstacle detection device in which at least two image pick-up devices each pick up an image of a preset common detection region, and a determination is made from stereo images picked up using the image pick-up devices whether or not the detection region includes an obstacle. In the device, included are: an image input section for receiving the stereo images from the image pick-up devices; a correspondence detection section for deriving a plurality of pairs of corresponding points in the detection regions of the received stereo images; a slope degree calculation section for calculating a slope degree corresponding to a slope angle between a basic plane which is parallel to optical axes of the image pick-up devices and a detection plane including the derived plurality of corresponding points of the stereo images; and a result determination section for determining as there being an obstacle when the slope degree of the detection plane is larger than a predetermined value.

An embodiment of the present invention is a recording medium having recorded a program for realizing, by computer execution, an obstacle detection method in which at least two image pick-up devices each pick up an image of a preset common detection region, and a determination is made from stereo images picked up using the image pick-up devices whether or not the detection region includes an obstacle. In the method, realized are: an image input function for receiving the stereo images from the image pick-up devices; a correspondence detection function for deriving a plurality of pairs of corresponding points in the detection regions of the received stereo images; a slope degree calculation function for calculating a slope degree corresponding to a slope angle between a basic plane which is parallel to optical axes of the image pick-up devices and a detection plane including the derived plurality of corresponding points in the stereo images; and a result determination function for determining as there being an obstacle when the slope degree of the detection plane is larger than a predetermined value.

BRIEF DESCRIPTION OF THE DRAWINGS

FIG. 6 is a schematic diagram illustrating a detection region image with no obstacle;

FIG. 7 is a schematic diagram illustrating a detection region image with any obstacles;

FIG. 13 is a schematic diagram showing pairs of corresponding points in a case where a detection region or any corresponding point is displaced.

DETAILED DESCRIPTION

In the below, an embodiment of the present invention is described by referring to FIGS. 1, 2, and 6 to 14.

Figure 1:
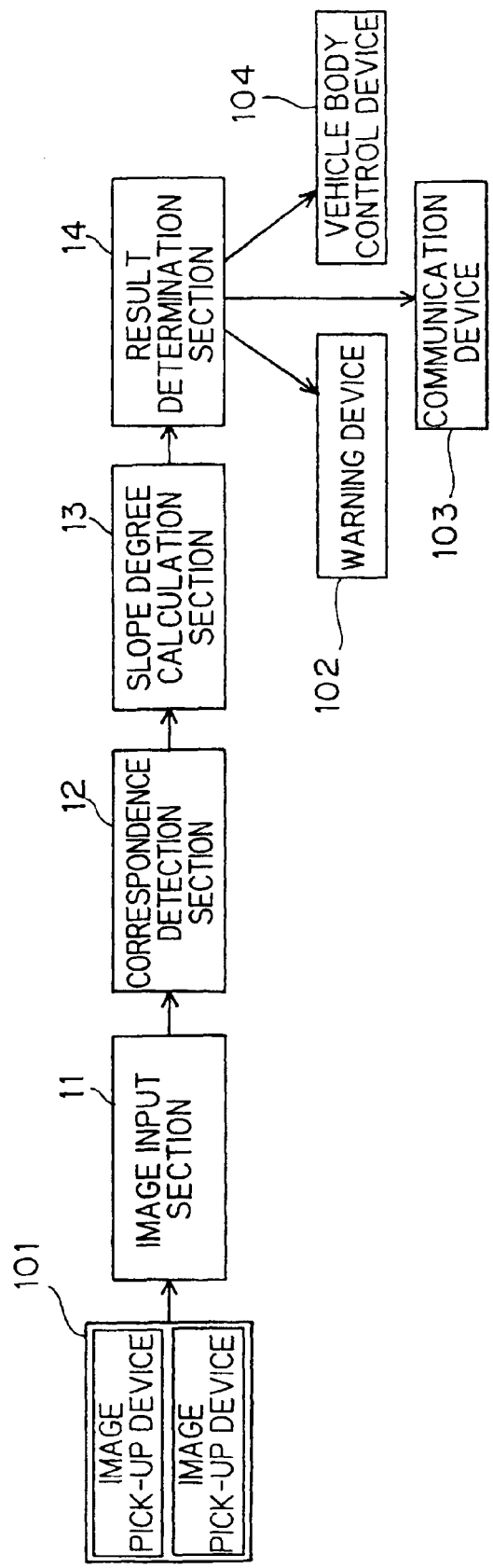
FIG. 1 is a schematic diagram showing the structure of an obstacle detection device according to an embodiment of the present invention.

FIG. 1 is a schematic diagram showing the structure of an obstacle detection device 10 of the present embodiment.

The obstacle detection device 10 is structured by an image input section 11, a correspondence detection section 12, a slope degree calculation section 13, and a result determination section 14.

When the result determination section 14 determines as there being an obstacle, a warning device 102 may warn a driver or a supervisor. Further, if the obstacle detection device 10 is mounted in a vehicle, vehicle body control means 103 may be provided for braking. Alternatively, vehicle braking by steering is a possibility. In any case, a communications device 104, or the like, may be provided to receive any output or transferred result.

In the obstacle detection device 10, the image input section 11, the correspondence detection section 12, the slope degree calculation section 13, and the result determination section 14 are functionally realized by computer-stored programs.

1. Image Input Section 11

Figure 2:
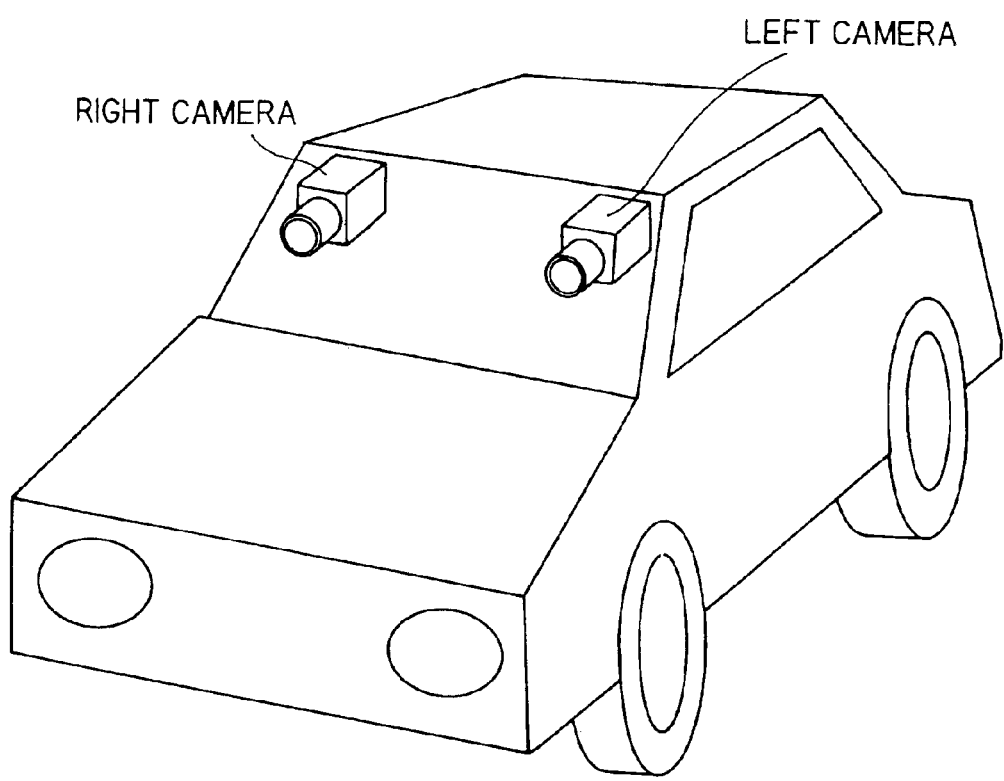
FIG. 2 is a schematic diagram showing the set-up state of image pick-up devices mounted in a vehicle.
Figure 3:
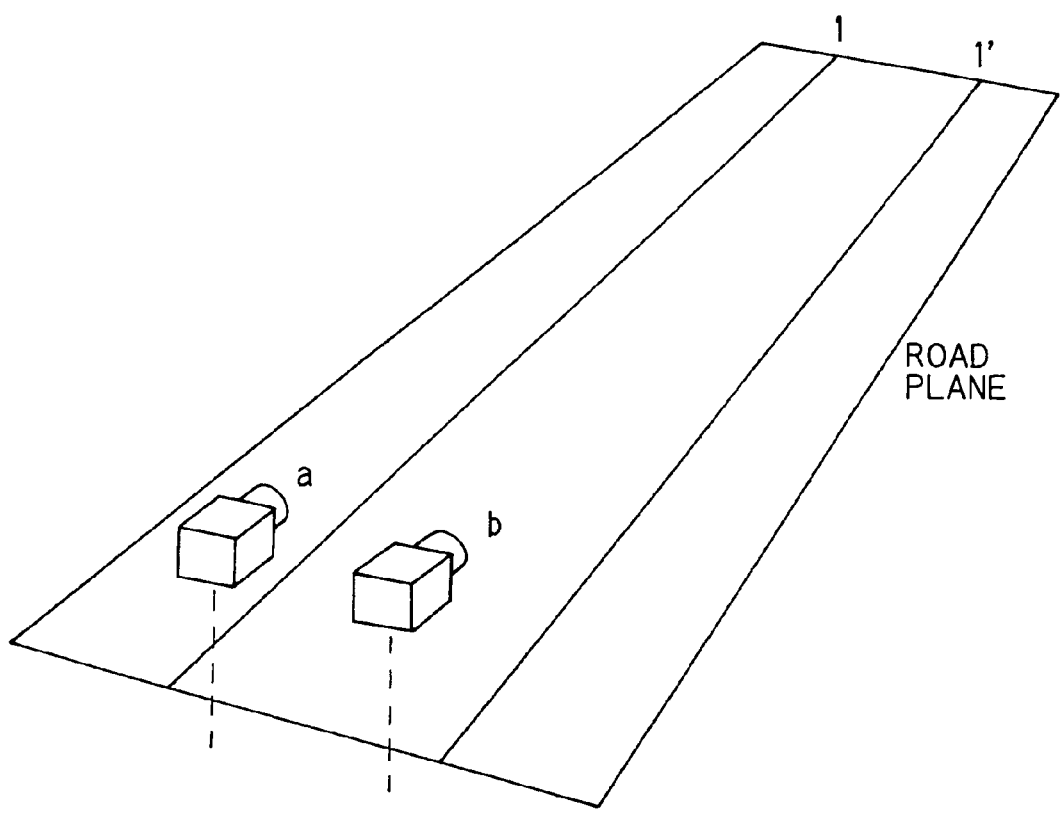
FIG. 3 is a schematic diagram showing a road plane and the set-up state of image pick-up devices.

The image input section 11 receives images from arbitrary number of image pick-up devices 101. In the present embodiment, the image pick-up device 101 exemplified by a CCD camera are plurally provided. In a case where two of the devices are mounted in a vehicle, as shown in FIG. 2, those are attached to the front part of the vehicle, on the right and left sides. If two are provided above a road, as shown in FIG. 3, those are so provided as to face in the direction the road is extending. The optical axes of these two image pick-up devices 101 are parallel to each other.

The image input section 11 subjects, to A/D conversion, video signals coming from a plurality of image pick-up devices. Then, the A/D conversion result is stored in memory of the image input section 11 as digital images or image sequences. In response to a request, the images of arbitrary time and arbitrary region are output to the correspondence detection section 12 in the following stage.

2. Correspondence Detection Section 12

The correspondence detection section 12 performs corresponding point search with respect to the images picked up by the image pick-up devices 101 and stored in the image input section 11.

Specifically, the corresponding point search is done to find any specific point(s) in real world shared by the images picked up by the cameras. In this embodiment, thus found corresponding points are used for calculating a slope degree in the slope degree calculation section 13 in the next stage. Here, 3D structure reconstruction is not done by the general stereoscopic image processing. Thus, the corresponding point search is not necessarily strictly done, and any simpler method requiring less calculation can be used.

Considered now is a case where a corresponding points are derived between an image picked up by the right camera and stored in the image input section 11 (hereinafter, referred to as right image) and an image picked up by the left camera at the same time (hereinafter, left image).

2-1. Calculation of Feature Quantity of Right Image

First, arbitrary pixels or arbitrary regions in the right image are calculated for their predetermined feature quantities. Any pixel or region large in feature quantity is selected as a feature point of the right image.

Herein, the "feature quantity" denotes arbitrary information derivable for each pixel or in an arbitrary region. Possibly used as the feature quantity are simply a pixel brightness intensity value or color information, or an arbitrary scalar or vector calculatable from results derived by arbitrary object detection or a region segmentation process such as differentiation or integration result in space or time, arbitrary filter superposition result, or mean or variance statistic, or calculatable from images such as feature quantities or movement quantities of a region derived by these results. In this example, described is a case where the feature quantity is a brightness intensity pitch at a pixel position.

Here, the "intensity gradient" denotes a degree of brightness intensity change in the vicinity of the pixels, and the closer to the boundary regions, i.e., edges, of objects or object structures in images, the larger the value gets.

To calculate such a brightness intensity pitch, a filter such as a Sobel operator may be applied to a target image.

If the Sobel operator is used simply for deriving a brightness intensity pitch in the vertical direction of the image, the following equation 8 can be used.

$$D(x, y) = \sum_{i,j=M \ldots M} sgn(i) I(x+i, y+j) \quad (8)$$

$$sgn(i) = \begin{cases} -1 & (i < 0) \\ 0 & (i = 0) \\ 1 & (i > 0) \end{cases}$$

Herein, a brightness intensity value of a pixel (x, y) is I(x, y), D(x, y) is a brightness intensity pitch value in the vertical direction, and 2M+1 is the filter size. From the pixel (x, y) whose absolute value |D(x, y)| being large, an arbitrary number of pixels are regarded as the feature points in the right image. Alternatively, as for a certain threshold value Th, any pixel (x, y) satisfying |D(x, y)|>Th are the features points in the right image.

Various other filters can be used for deriving a brightness intensity pitch, including Laplacian, Robinson, and Canny, and any will do. Other than a well-known method for deriving a brightness intensity pitch, there are many methods for calculating the feature quantity of images. The details are described in, for example, Non-patent Literature 1 (edited by Takagi and Shimoda, Image Analysis Handbook, Tokyo University Press, ISBN4-13-061107-0).

2-2. Detection Corresponding Point in Left Image

Next, calculated is a point in the left image correspond to the feature point in the right image.

Methods for calculating a matching level between arbitrary pixels or arbitrary regions is called matching, and typified by template matching. With the template matching, a region in the vicinity of the feature point in the image is used as a template, and the template is compared to an arbitrary part of the target search region in the image to find a region showing a tight match.

2-2-1. Method Using SAD

In a method using the easiest SAD (sum of Absolute Difference), the following equation 9 is solved for each pixel (x, y) in the search region. The pixel (x, y) resulting in the smallest R(x, y) is derived as a corresponding point. Herein, a template region is K, a brightness intensity value of a template pixel is T(i, j) (in this embodiment, the region in the vicinity of the feature point derived for the right image), and a brightness intensity value of the pixel in the search region is I(x, y)(in this embodiment, the search region set for the feature point in the left image).

$$R(x, y) = \sum_{(i,j) \in K} |T(i, j) - I(x + i, y + j)| \qquad (9)$$

Figure 4:
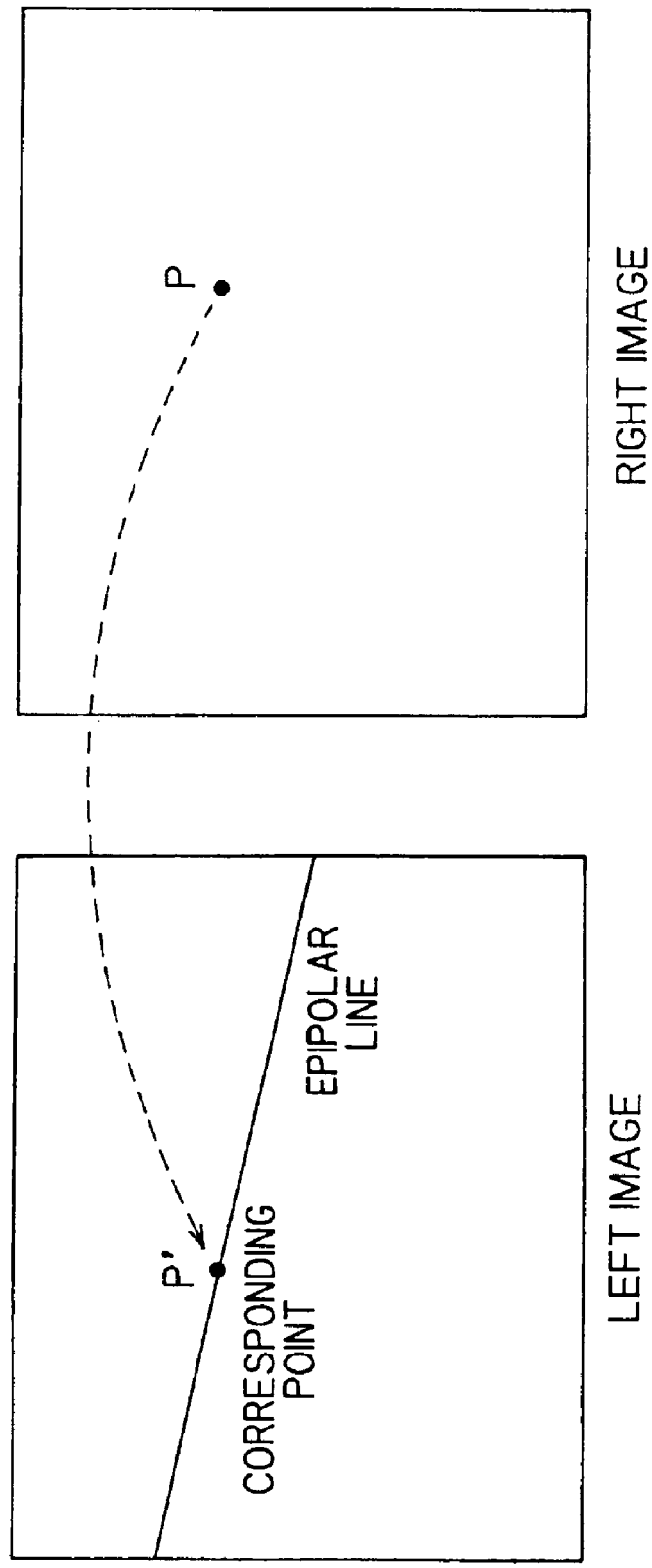
FIG. 4 is a schematic diagram showing epipolar constraint applied to an arbitrary point.
Figure 5:
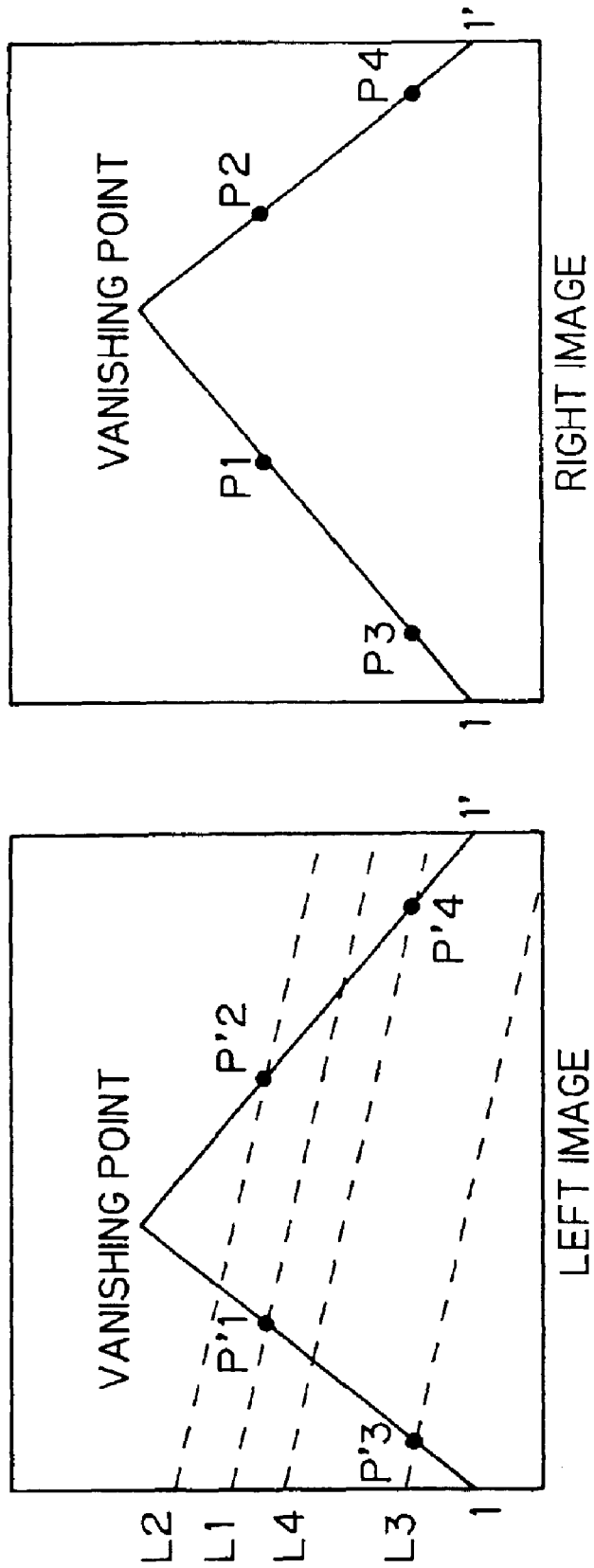
FIG. 5 is a schematic diagram showing epipolar constraint applied points on white lines 1 and 1'.

Here, as described referring to FIG. 4, the corresponding point is located on an epipolar line. Thus, the search region of the corresponding point is limited onto the epipolar line, thereby reducing calculating task for the corresponding point search. Further, in a case where the optical axes of the cameras are parallel to each other, the epipolar line agrees with the scanning line, making the corresponding point search easier.

2-2-2. Other Methods

There are other various methods for deriving corresponding points, including a method using SSD (Sum of Squared Difference), a sequential similarity detection algorithm (SSDA), a normalized correlation coefficient method, structure matching, and the like, and any arbitrary method is applicable. The above Non-Patent Reference 1 shows details about well-known methods.

2-2-3. Case of Calculating a Plurality of Corresponding points for One Feature Point Alternatively, a plurality of corresponding points in the left image may be searched for one feature point in the right image.

In the above, after the corresponding point search by template matching using SAD, only a point (x, y) resulting in the smallest R(x, y) is regarded as a corresponding point. Here, on the other hand, regarded as corresponding points are points (x', y') and (x", y") resulting in, respectively, the second and third smallest R(x', y') and R(x", y"), for example. In this manner, an arbitrary number of corresponding points in the left image can be derived for one feature point in the right image.

2-2-4. Other Corresponding Point Search

Such a corresponding point search is applicable not only to original images, i.e., brightness intensity value images, but also to images as a result of the arbitrary feature quantity calculation described in the above.

3. Slope Degree Calculation Section 13

The slope degree calculation section 13 uses pairs of corresponding points in the right and left images derived by the correspondence detection section 12 to find a slope degree corresponding to a slope angle of a plane in a 3D space in the detection region (in the below, referred to as detection plane).

Here, the "slope angle" is an angle between the road plane and the detection plane, and is a pitch angle with respect to the road plane, having small yaw and roll angles. Details are left for later description. Note that, the road plane is a plane (basic plane) which is parallel to optical axes of two image pick-up devices 101.

The slope angle is not a tilt to a horizontal plane but a tilt to the road plane. Even if a vehicle having the image pick-up device 101 mounted therein is driving on a road plane tilted against the horizontal plane, i.e., slope, the "slope angle" between the road plane and a plane parallel thereto is 0 degree.

Figure 9:
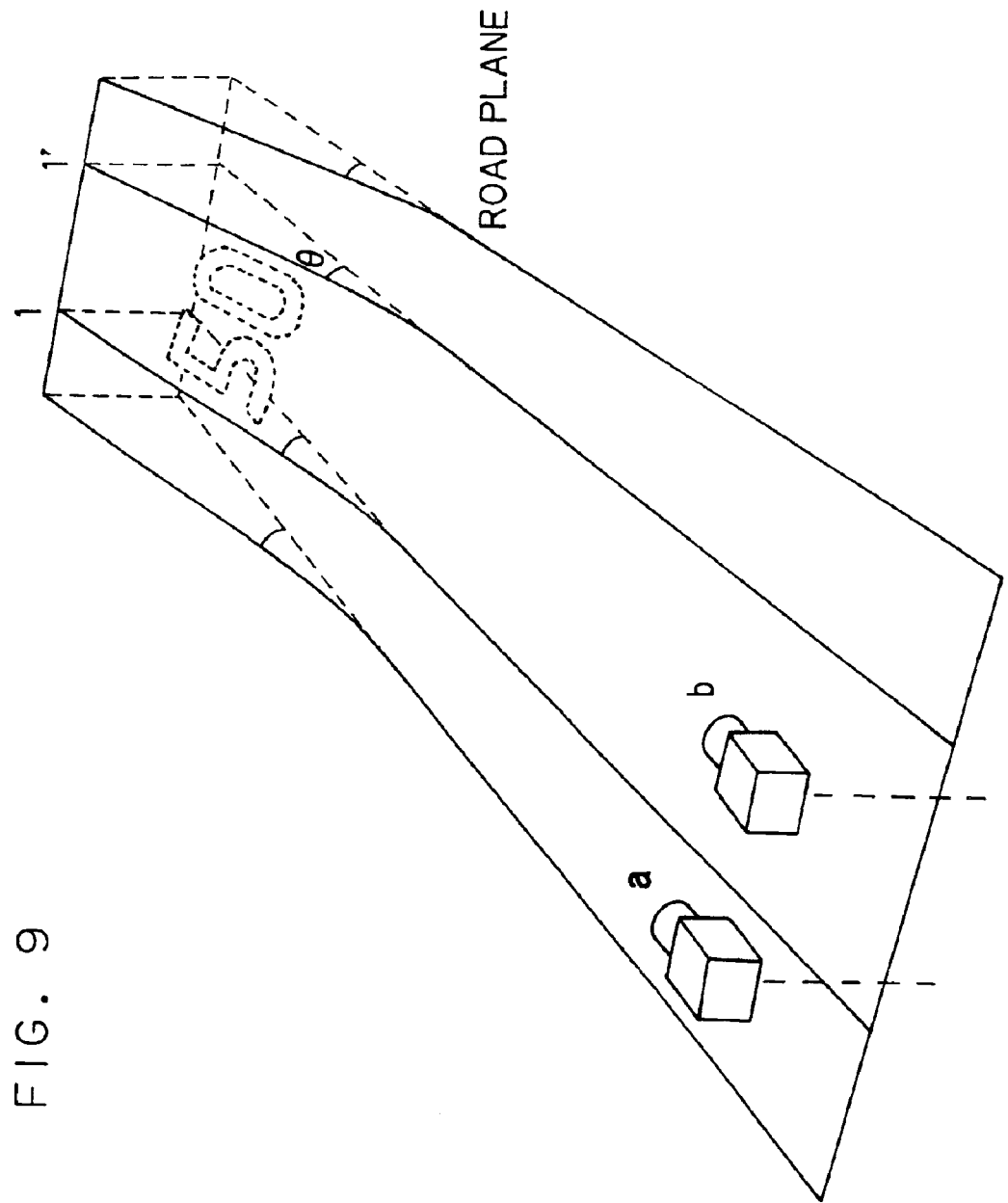
FIG. 9 is a schematic diagram showing a case where a slope is observed ahead of cameras.

The pitch angle is a slope angle θ in the vertical direction forming with two image pick-up devices 101, as shown in FIG. 9. Here, the yaw angle is a tilt in the horizontal direction, that is, the yaw angle is 0 degree if the road is straight. The roll angle is a tilt about an optical axis, that is, the roll angle is 0 degree with the horizontal plane.

The terms "slope angle" and "slope degree" are different, and a slope degree changes with respect to a slope angle. Details will be described later.

3-1. Theory of Slope Degree Calculation Section 13

According to Affine GP constraint in the above Patent Literatures 1 and 2 (H. Hattori and A. Maki, Stereo without Depth Search and Metric Calibration, in proc. of IEEE Computer Society Conference on Computer Vision and Pattern Recognition, CVPR 2000, pp. 177–184, 2000), about 3D coordinates of a point on the road plane when a point of origin is a midpoint between two cameras, the equation 7 representing the relationship of corresponding points between the stereoscopic images can be expressed much simpler. This is applicable with an assumption that coordinate values in the optical axis direction of the cameras are sufficiently large for coordinate values of the image in vertical and horizontal directions (z>>x, z>>y, in which z denotes the optical axis direction, x denotes the horizontal direction of the image, and y denotes the vertical direction of the image).

That is, assuming that a point as a result of projecting a certain point on the road plane onto the right image is P(u, v), and a point correlating thereto in the left image is P'(u', v'), the relationship is expressed by the following equation 10.

$$\begin{pmatrix} u' \\ v' \end{pmatrix} = A \begin{pmatrix} u \\ v \end{pmatrix} + \begin{pmatrix} t_u \\ t_v \end{pmatrix} \qquad (10)$$

Herein, A denotes a 2×2 affine transformation matrix, and $(t_u, t_v)^T$ denotes a vector indicating translation. To derive those, three or more pairs of corresponding points on the road plane are used in a similar manner for h in the equation 6. By deriving those in advance before obstacle detection, as long as the relationship between the cameras in position or posture remains the same, there is no need to derive those twice for successive obstacle detection.

Further, if both cameras are oriented toward a vanishing point of the road, and if rotation about the optical axis of the camera is small enough, A can be approximated by the following equation 11. The affine transformation matrix A will be dependent only on λ

$$A = \begin{pmatrix} 1 & \lambda \\ 0 & 1 \end{pmatrix} \qquad (11)$$

The positional displacement of the corresponding points in the horizontal direction in the right and left images is called a parallax d, and assuming that d=u'−u, the parallax d is dependent only on the image coordinate v. It can be simply expressed as the following expression.

$$d = \lambda v + t_v \qquad (12)$$

Considered now is a method using the relationship for locally estimating λ.

First, a local detection region is determined, and a reference point is set to o. From coordinates $V_o$ of this point, a displacement v-$v_o$ is newly set as v. Assuming that the detection region is a plane or a part of a plane, and λ and v in the detection region are displaced by Δλ and Δv, respectively. The resulting parallax caused thereby is newly set as d, and the following equation is established.

$$d = \Delta \lambda v + \Delta d \qquad (13)$$

The first term on the right side of the equation 13 Δλxv is dependent on v, and the second term Δd is a parallax element generated by Δv but not dependent on v, being constant in the local region.

With two or more pairs of corresponding points $P_i(u_i, v_i)$, $P_i'(u_i', v_i')$ (i=1 . . . N) at hand, the fluctuation value $\Delta\lambda$ in the detection region of $\lambda$ can be derived. In detail, with unknown $\Delta\lambda$ and $\Delta v$, the parallax $d_i=u_i'-u_i$ and the resulting value $v_i$ are substituted into the equation 13, and the simultaneous linear equations as a result thereof is solved. Thus derived fluctuation value $\Delta\lambda$ is the "slope degree" as will be described later.

If the feature points are all on the road plane, coordinates of pairs of corresponding points are supposed to satisfy the equation 10, and the fluctuation value $\Delta\lambda$ is roughly equal to 0. On the other hand, if the feature points are not on the road plane but on any obstacle, the equation 10 is not satisfied, and $|\Delta\lambda|>>0$.

As such, the fluctuation value $\Delta\lambda$ is a factor for determining whether or not the detection region include any obstacle therein.

3-2. Description by way of Illustration

Referring to schematic drawings, the principle of the slope degree calculation section 13 is described.

3-2-1. Calculation of Fluctuation Value $\Delta\lambda$

FIG. 6 is a schematic diagram showing a case where image regions R and R' are previously set in the right and left images as both detection regions. Both detection regions each include white lines and a road sign, but no obstacle.

In the right image region R, six feature points $P_1$ to $P_6$ are found, and for each thereof, a corresponding point is derived in the left image region R', points $P_1'$ to $P_6'$.

Similarly, FIG. 7 shows an exemplary result of finding corresponding points in the region R' with respect to feature points in the region R including an obstacle.

Figure 8:
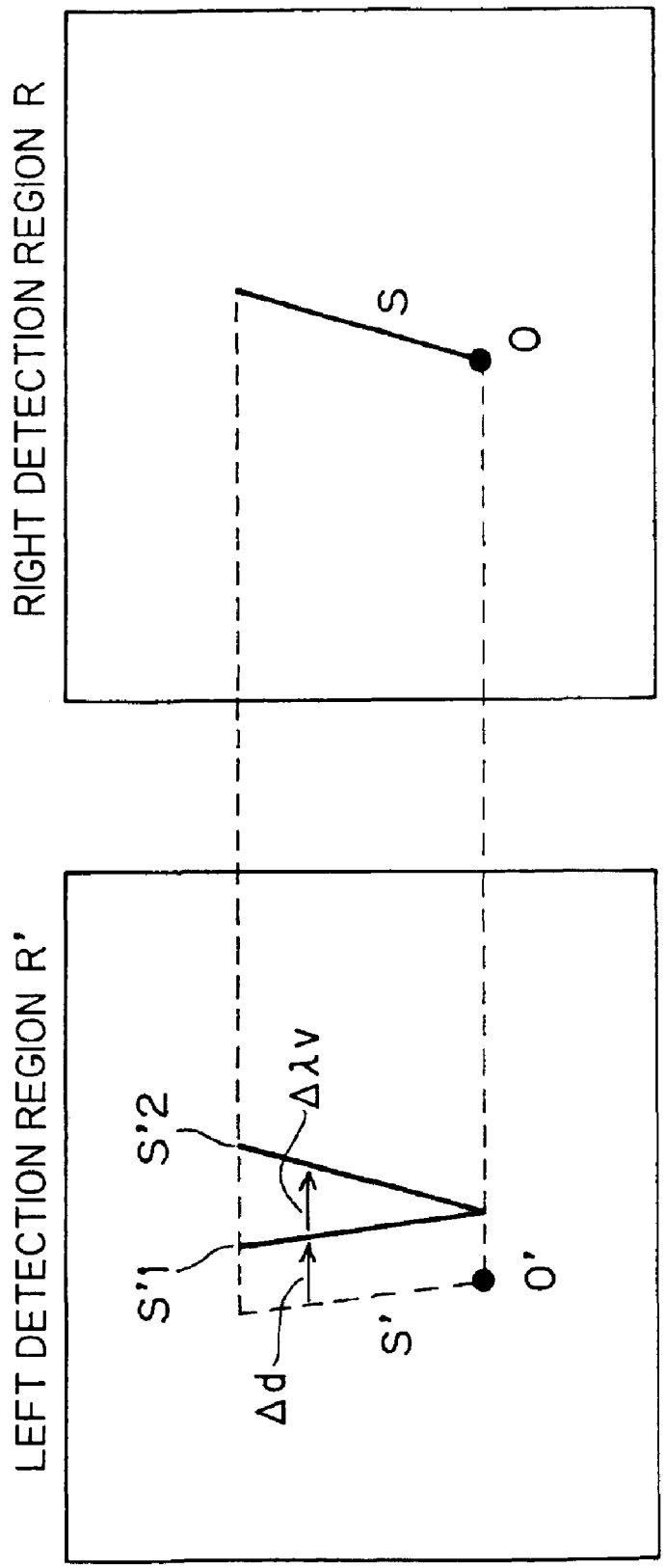
FIG. 8 is a schematic diagram showing a parallax on a line segment in a detection region.

First, in FIG. 6, focus on a line segment $P_2P_5$ in the region R and the corresponding line segment $P_2'P_5'$ in the region R'. FIG. 8 shows enlarged version of these line segments as s and $s_1'$, s corresponding to $P_2P_5$, and $s_1'$ to $P_2'P_5'$. The line segment s' in the left region R' is a result of converting the line segment s by the affine transformation equation 10 based on the approximation of the equation 11. The reason why the line segment s' in the image has a different tilt from the line segment s is that $|\lambda|$ is not 0 but large. Due to disturbance caused by displacement of the reference point o or vanishing point, the line segment s actually corresponds to a line segment $s_1'$ locating at a position displaced therefrom by a constant $\Delta d$. Thus, solving the equation 13 derived from the coordinates of the feature points and their corresponding point, i.e., $P_2$, $P_5$, $P_2'$, and $P_5'$, will lead to a solution, $\Delta\lambda$ being roughly equal to 0.

Next, in FIG. 7, focus on a line segment $P_1P_3$ in the region R and the corresponding line segment $P_1'P_3'$ in the region R'. FIG. 8 shows enlarged version of these line segments as s and $s_2'$. In this case, the line segment s is not located on the road plane, and thus the line segment $S_2'$ corresponding thereto has a different angle from the line segment s' derived by subjecting the line segment s to affine transformation. That is, to transform the line segment s to $s_2'$, the transformation should be carried out in such a manner as to laterally displace points on the line segment by an amount proportional to v. And solving the equation 13 using the coordinates of $P_1$, $P_3$, $P_1'$, and $P_3'$ will lead to $\Delta\lambda$, satisfying $|\Delta\lambda|>>0$. In this example, assuming that the protuberance and hollow of the backside of the obstacle (vehicle ahead) are sufficiently smaller than the distance from the cameras, and an obstacle surface is regarded as a plane (i.e., detection plane) and approximately perpendicular to the optical axes of the cameras. Under such assumptions, the line segments s and $s_2'$ become roughly parallel to each other on the original image, thereby rendering $\Delta\lambda$ roughly equal to $-\lambda$ (at this time, A is a unit matrix).

Described above is a case of calculating $\Delta\lambda$ using a line segment between two corresponding points on the detection plane in the detection region.

3-2-2. Calculation of Slope Angle from Basic Plane of Object Plane

The affine transformation parameter is derived utilizing a fact that the parallax d in the equation 13 is dependent only on a v coordinate of a feature point. This is equivalent of deriving a pitch angle (i.e., slope angle) from a road plane (i.e., basic plane) in the detection region, in which the detection region is a plane in 3D space or a part thereof (this is the detection plane). Herein, as to the detection plane, yaw and roll angles other than the pitch angle are presumed as being sufficiently small.

Figure 10:
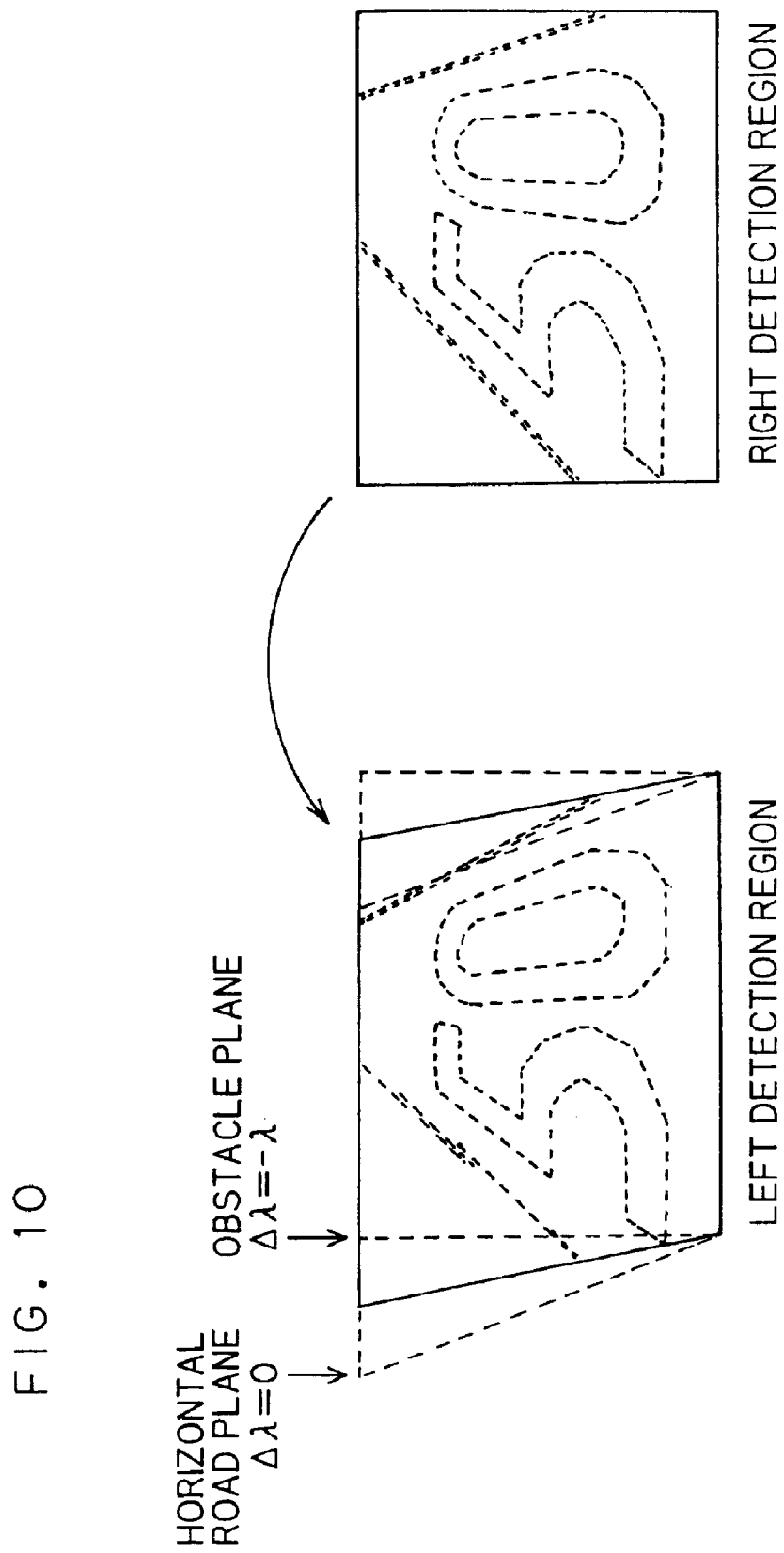
FIG. 10 is a schematic diagram showing image conversion in a case where a road sign is placed on the slope.

Referring now to FIGS. 9 and 10, this is described.

The slope angle of the detection plane corresponds to $\theta$ in FIG. 9. Approximation such as the equation 11 is applicable to a case where only the slope angle $\theta$ changes. If this is the case, in FIG. 10, the equation 10 means that the rectangular detection region in the right image is transformed into a parallelogram in the left image. Displacement occurring at the time of such a transformation is dependent, directly, on the size of $\lambda+\Delta\lambda$, and the actual cause is the size of $\theta$. As shown in FIG. 9, when there is a road sign on the slope ahead of the road, and when the detection region is around the road sign, the detection region is transformed into a parallelogram of intermediate state considering road being horizontal and obstacle being vertical. Depending on the size of $\theta$, $\Delta\lambda$ will take an intermediate value between 0 and $-\lambda$. Accordingly, by solving the equation 13, derived is the value $\Delta\lambda$ showing a monotonous change depending on the size of the slope angle $\theta$.

Further, in the above example, the rectangle is transformed into a parallelogram using approximation of the equation 11. Accordingly, the feature points and corresponding points do not necessarily aligned on the linear lines, but only need to be located on some plane.

Therefore, in FIG. 6 example, by solving the equation 13 derived from the pairs of feature points and corresponding points, $P_1, \ldots P_6, P_1', \ldots P_6'$, $\Delta\lambda$ can be derived with higher accuracy compared with a case of using a pair of line segments. Even if the feature points and corresponding points are found on an obstacle having protuberances and hollows, such an obstacle is regarded as a plane if the distance from the camera is large. Accordingly, using every feature point and corresponding point, a slope angle of the detection plane (obstacle plane in FIG. 10) can be approximately derived.

As such, $\Delta\lambda$ is a quantity derived depending on the slope angle $\theta$ of the detection plane, and $\Delta\lambda$ can be forwarded to the result determination section 14 in the next stage as the slope degree.

Here, as the slope degree, a unique value derivable from $\Delta\lambda$ (e.g., $|\Delta\lambda|$) will do.

3-2-3. Other Calculation Method for $\Delta\lambda$

Generally, when the detection region includes m feature points, and for each thereof, n corresponding point at the maximum, m×n pairs of corresponding points can be derived at the maximum. Solving the equation 13 derived from all of these pairs will lead to $\Delta\lambda$. The equation can be solved using two pairs of corresponding points, but three or more pairs will make the equation redundant. Thus, a statistical technique such as least square is effective to derive $\Delta\lambda$ with higher accuracy.

Further, using a technique as Hough transform eliminates the need for solving the equation to derive $\Delta\lambda$.

Figure 11:
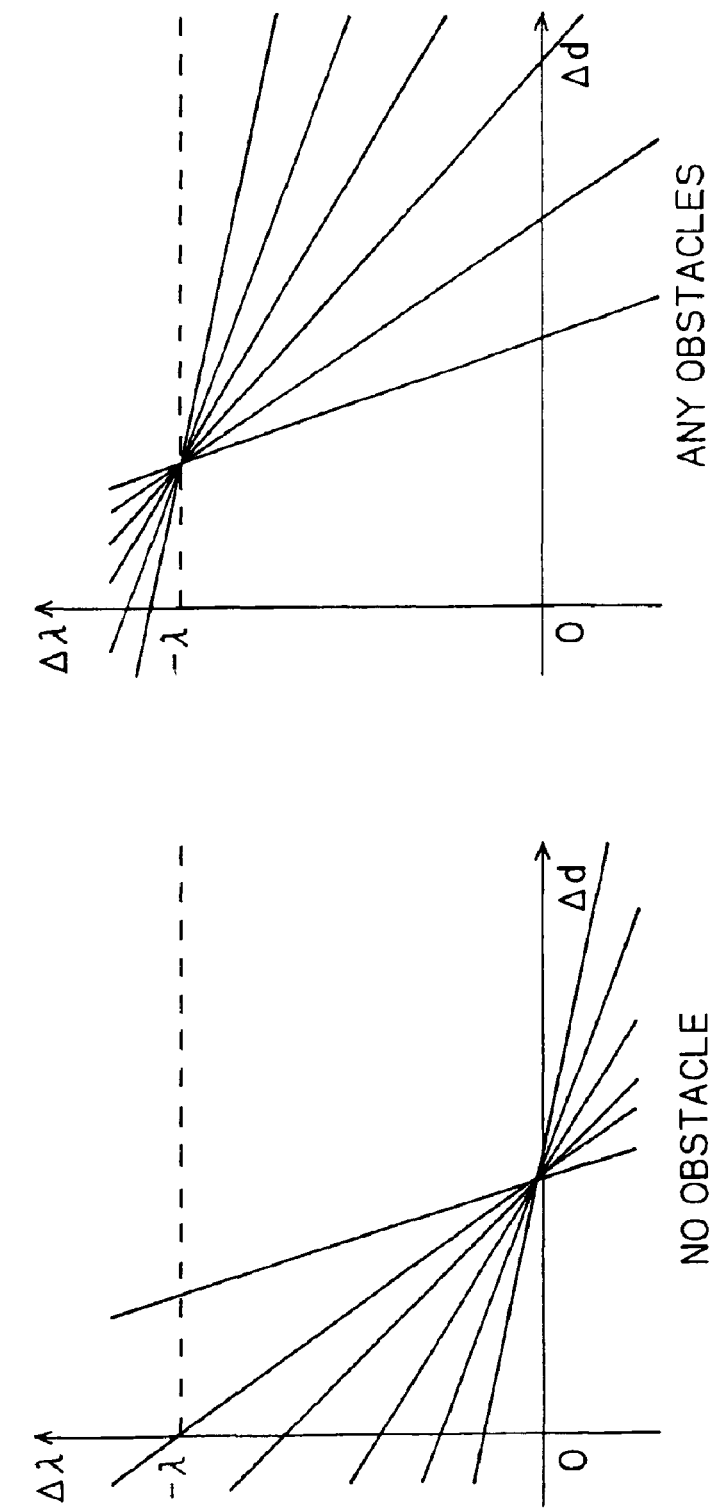
FIG. 11 is a schematic diagram showing a method for calculating slope degrees.
Figure 12:
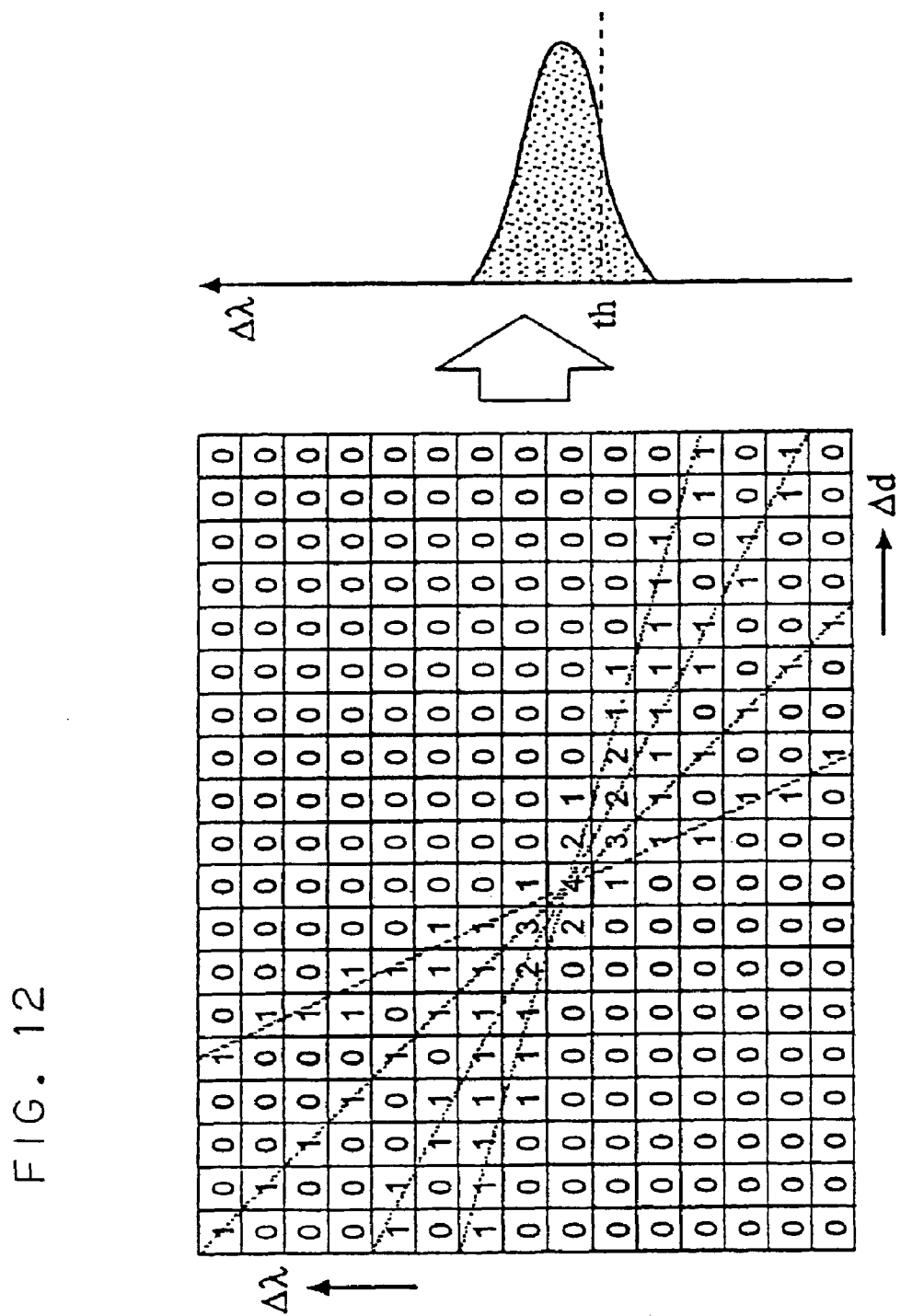
FIG. 12 is a schematic diagram showing a voting method at the time of slope degree calculation.

This is described by referring to FIGS. 11 and 12.

Solving the equation 13 is equivalent of deriving an intersection point of lines derived from a plurality of pairs of corresponding points. Herein, the equation 13 is regarded as a linear line in $\Delta d-\Delta\lambda$ space.

As shown in FIG. 12, the $\Delta d-\Delta\lambda$ space is divided into a plurality of square cells, and when a line passes though the cells, the corresponding cells are increased in value. Such a process is referred to as voting process. After subjecting such a voting process to every possible line, finding a cell position showing the largest value leads to $\Delta\lambda$. Such a method is effective even if not all the lines intersect at a point, and if a plurality of maximum values are found, the cell position showing the largest value leads to $\Delta\lambda$, for example.

Similarly, referring to the right side of FIG. 12, after the voting process, by calculating a profile through an addition of cell values only those being larger than a certain value in the lateral direction, the distribution of $\Delta\lambda$ can be known. The distribution result may be forwarded to the next result determination section 14 as the distribution of the slope degrees.

3-3. Case Where Detection Region is Extending Over Obstacle and Road Plane

Considered now is a case where, as shown in FIG. 13, a detection region is extending over an obstacle and a road plane, and feature points and corresponding points are detected both on the obstacle ($P_1$, $P_3$, $P_6$, $P_1'$, $P_3'$, and $P_6'$) and the road plane ($P_2$, $P_4$, $P_2'$, and $P_4'$), or detection of some corresponding points have gone wrong ($P_5$, and $P_5'$).

Figure 14:
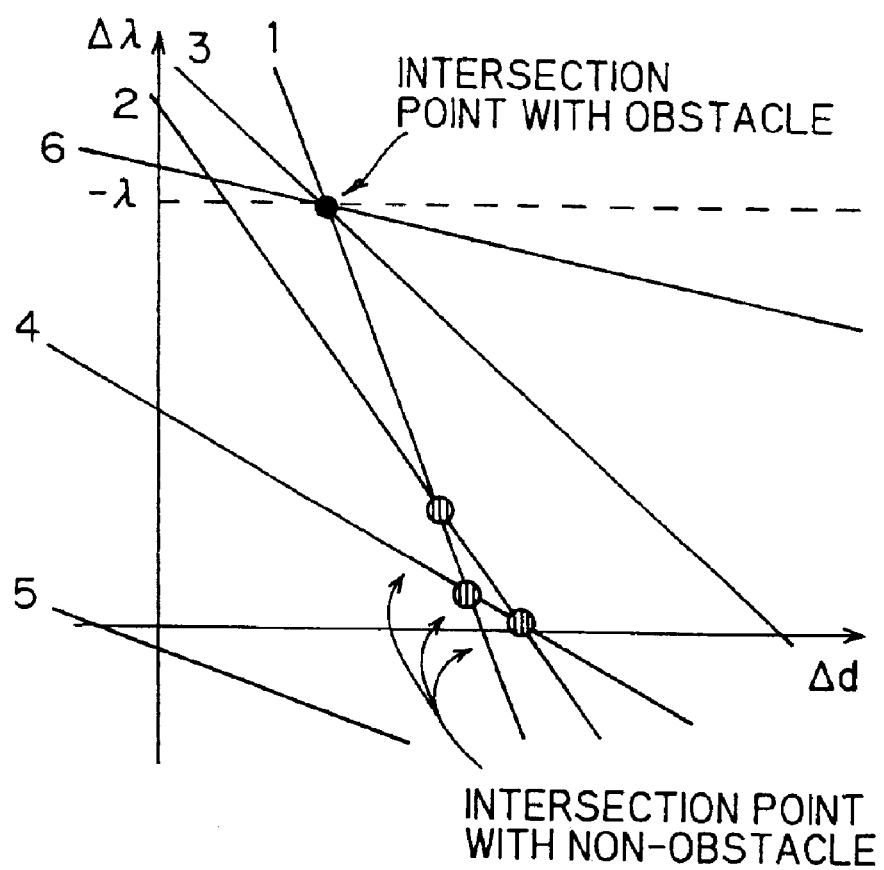
FIG. 14 is a schematic diagram showing a slope degree calculation in a case where a detection region or any corresponding point is displaced.

Assuming that linear lines drawn from the pairs of $P_1 \ldots P_6$, and $P_1' \ldots P_6'$ to $\Delta\lambda-\Delta d$ space are lines 1 to 6 in FIG. 14, the resulting intersection point will be located near $\Delta\lambda=-\lambda$. This intersection point is distinguishable from others derived from pairs of corresponding points on other road planes or pairs of wrong corresponding points.

Further, if the pairs of corresponding points on the obstacle are dominant in number, the voting value of the intersection point after Hough transformation becomes high.

Accordingly, with such a criteria as an intersection being closer to $\Delta\lambda=-\lambda$, or the voting value thereof being large, only the pairs of corresponding points locating on the obstacle can be distinguished. With FIG. 13 example, only the points of $P_1$, $P_3$, $P_6$, $P_1'$, $P_3'$, and $P_6'$ can be detected through distinction as belonging to the obstacle.

4. Result Determination Section 14

The result determination section 14 refers to the slope degree of the detection region or a distribution thereof derived by the slope degree detection section 13, and determines whether or not the detection region includes any obstacle.

$\Delta\lambda$ calculated by the slope degree calculation section 13 shows a monotonous change depending on the slope angle of the detection region. When the plane in the detection region is almost parallel to the basic plane, $\Delta\lambda$ is roughly equal to 0, and when perpendicular, $\Delta\lambda$ is roughly equal to $-\lambda$.

Thus, in the simplest manner, a threshold value is so set in advance as to accept the FIG. 9 slope including no obstacle, and through comparison between $\Delta\lambda$ and the threshold value, a determination can be made whether there is any obstacle.

For example, as to a certain threshold value th, if $|\Delta\lambda|>th$ is satisfied, it is determined as there being an obstacle.

Moreover, if the slope degree is at hand as distribution, a statistical determination using the distribution may be used to make such a determination.

For example, referring to the right side of FIG. 12, the area above th is $p_1$, and the area below th is $p_2$, it is determined as there being an obstacle when $p_1>p_2$ is satisfied.

Viewing the distribution as probability distribution, a posteriori probability p of including an obstacle can be derived by $p_1/(p_1+p_2)$, for example, and when $p>0.5$ is satisfied, it may be determined as there being an obstacle.

As described in the foregoing, using a slope degree of a detection region derived by the slope degree calculation section 13 or a distribution thereof, by an arbitrary method, a determination can be made whether there is any obstacle.

As such, using a plurality of cameras mounted in a vehicle or provided above a road, even if the relationship between the road plane and the cameras constantly changes in relative position or posture due to camera vibration or a change in road tilt, any obstacles located on the road such as other vehicles ahead, parked vehicles, and pedestrians on the road can be detected without confusing those with textures including white lines, road signs, paint, road stains, and shadows of roadside objects, all of which do not disturb vehicle driving. Further, unnecessary operations such as erroneous warning or unnecessary vehicle control can be reduced to a great degree.

Modification Example 1

Here, the present invention is not limited to the above embodiment, and it is understood that numerous other modifications and variations can be devised without departing from the scope of the invention.

For example, the detection region is a square in the embodiment, but the shape is not restrictive thereto, and any predetermined arbitrary shape will do.

Modification Example 2

In the above, the detection regions R and R' are predetermined in the right and left camera images. Alternatively, such an obstacle detection method as described in Patent Literature 3 (JP-A-2001-154569) may be used for a preprocessing, and a result derived thereby may be used to set detection regions. To set detection regions, some driving lane detection method may be used, and a result derived thereby may be used under a predetermined method.

Modification Example 3

Even if no detection region is set in advance, the right and left camera images may be scanned, and at each scanning position, the operation of the embodiment may be executed for a similar object detection process.

Modification Example 4

In the present embodiment, the equation 10 and other between-image relational expressions and drawings are provided for conversion from the right image region to the left image region. Those are not surely restrictive, and all allow conversion from the left image to the right image.

Modification Example 5

Described above is a case where two of the image pickup devices such as cameras are provided. The number of the devices is not restrictive, and even if three or more of the image pick-up devices are provided, the embodiment is applicable to a combination of arbitrary two image pick-up devices. If this is the case, the results derived from every possible combination may be integrated together to realize the object detection device with a higher accuracy.

Modification Example 6

The road plane is assumed as being plane. The present embodiment is applicable, even if the road surface is curved, it may be partially divided to approximate it as the plane.

Modification Example 7

The object of the present invention is not limited for helping safe driving and realizing automatic driving of the vehicle, or for counting the number of passing vehicles on the road or monitoring those passing vehicles for their driving. Providing the cameras to the rear part of the vehicle allows rear monitoring, and to airplanes or helicopters allows object detection at the time of takeoff and landing. Also, providing the cameras to industrial or household robots allows object detection or monitoring for automatic driving. As such, the present invention is applicable to various many applications.

INDUSTRIAL APPLICABILITY

As is known from the above, according to the present invention, no matter what road an obstacle detection device is set up, or no matter what road a vehicle having the device mounted therein is driving, object detection can be achieved with high accuracy regardless of vibration during the device operation or vehicle driving. Specifically, the present invention successfully prevents the conventional problems of reducing the obstacle detection accuracy due to frequent erroneous detection especially around the texture on the road plane such as white lines, road signs, paint, road stains, shadows of roadside objects and vehicles, and the like. Accordingly, only true obstacles can be correctly detected, practically benefiting a great deal of effects.

What is claimed is:

1. An obstacle detection device in which at least two image pick-up devices each pick up an image of a preset common detection region, and which determines whether an obstacle is present or not in the detection region from the stereo images picked up using the image pick-up devices, the device comprising:

image input means for receiving the image from each of the image pick-up devices;

correspondence detection means for deriving a plurality of pairs of corresponding points in the detection regions of the received two stereo images;

slope degree calculation means for calculating a slope degree corresponding to a slope angle between a basic plane which is parallel to optical axes of the image pick-up devices and a detection plane including the derived plurality of corresponding points in the stereo images; and result determination means for determining as there being an obstacle when the slope degree of the detection plane is larger than a predetermined value.

2. The obstacle detection device according to claim 1, wherein the slope degree calculation means regards the slope angle as a pitch angle between the basic plane and the detection plane, and a parameter of an affine transformation matrix indicating a relationship between the corresponding points in the images or a unique value derived from the parameter as a slope degree.

3. The obstacle detection device according to claim 2, wherein the slope degree calculation means calculates the slope degree by solving an equation based on a parallax and vertical positions of the plurality of pairs of corresponding points.

4. The obstacle detection device according to claim 1, wherein the slope degree calculation means calculates the slope degree by voting coordinate values of the plurality of pairs of corresponding points into a voting space based on an equation satisfied by the coordinate values.

5. The obstacle detection device according to claim 1, wherein the slope degree calculation means detects, as an obstacle, out of the plurality of pairs of corresponding points, only the pair of corresponding points resulting in the slope degree large in value.

6. An obstacle detection method in which at least two image pick-up devices each pick up an image of a preset common detection region, and which determines whether an obstacles is present or not in the detection region from the stereo images picked up using the image pick-up devices, the method comprising:

an image receiving step of receiving the image from each of the image pick-up devices;

a correlation detecting step of deriving a plurality of pairs of corresponding points in the detection regions of the two stereo images;

a slope degree calculating step of calculating a slope degree corresponding to a slope angle between a basic plane which is parallel to optical axes of the image pickup devices and a detection plane including the derived plurality of corresponding points in the stereo images; and a result determining step of determining as there being an obstacle when the slope degree of the detection plane is larger than a predetermined value.

7. The obstacle detection method according to claim 6, wherein in the slope degree calculation step, the slope angle is regarded as a pitch angle between the basic plane and the detection plane, and a parameter of an affine transformation matrix indicating a relationship between the corresponding points in the images or a unique value derived from the parameter is regarded as a slope degree.

8. The obstacle detection method according to claim 7, wherein in the slope degree calculation step, the slope degree is calculated by solving an equation based on a parallax and vertical positions of the plurality of pairs of corresponding points.

9. The obstacle detection method according to claim 6, wherein in the slope degree calculation step, the slope degree is calculated by voting coordinate values of the plurality of pairs of corresponding points into a voting space based on an equation satisfied by the coordinate values.

10. The obstacle detection method according to claim 6, wherein in the slope degree calculation step, out of the plurality of pairs of corresponding points, only the pair of corresponding points resulting in the slope degree large in value is detected as an obstacle.

11. A program for realizing, by computer execution, an obstacle detection method in which at least two image pick-up devices each pick up an image of a preset common detection region, and a determination is made from stereo images picked up using the image pick-up devices whether or not the detection region includes an obstacle, the program comprising:

an image input function for receiving the stereo images from the image pick-up devices;

a correspondence detection function for deriving a plurality of pairs of corresponding points in the detection regions of the received stereo images;

a slope degree calculation function for calculating a slope degree corresponding to a slope angle between a basic plane which is parallel to optical axes of the image pick-up devices and a detection plane including the derived plurality of corresponding points in the stereo images; and a result determination function for determining as there being an obstacle when the slope degree of the detection plane is larger than a predetermined value.

12. The program of the obstacle detection method according to claim 11, wherein the slope degree calculation function regards the slope angle as a pitch angle between the basic plane and the detection plane, and a parameter of an affine transformation matrix indicating a relationship between the corresponding points in the stereo images or a unique value derived from the parameter as a slope degree.

13. The program of the obstacle detection method according to claim 12, wherein the slope degree calculation function calculates the slope degree by solving an equation based on a parallax and vertical positions of the plurality of pairs of corresponding points.

14. The program of the obstacle detection method according to claim 11, wherein the slope degree calculation function calculates the slope degree by voting coordinate values of the plurality of pairs of corresponding points into a voting space based on an equation satisfied by the coordinate values.

15. The program of the obstacle detection method according to claim 11, wherein the slope degree calculation function detects, as an obstacle, out of the plurality of pairs of corresponding points, only the pair of corresponding points resulting in the slope degree large in value.

16. An obstacle detection device in which at least two image pick-up devices each pick up an image of a preset common detection region, and a determination is made from stereo images picked up using the image pick-up devices whether or not the detection region includes an obstacle, the device comprising:

an image input section for receiving the stereo images from the image pick-up devices;

a correspondence detection section for deriving a plurality of pairs of corresponding points in the detection regions of the received stereo images;

a slope degree calculation section for calculating a slope degree corresponding to a slope angle between a basic plane which is parallel to optical axes of the image pick-up devices and a detection plane including the derived plurality of corresponding points in the stereo images; and a result determination section for determining as there being an obstacle when the slope degree of the detection plane is larger than a predetermined value.

17. A recording medium having recorded a program for realizing, by computer execution, an obstacle detection method in which at least two image pick-up devices each pick up an image of a preset common detection region, and a determination is made from stereo images picked up using the image pick-up devices whether or not the detection region includes an obstacle, the program comprising:

an image input function for receiving the stereo images from the image pick-up devices;

a correspondence detection function for deriving a plurality of pairs of corresponding points in the detection regions of the received stereo images;

a slope degree calculation function for calculating a slope degree corresponding to a slope angle between a basic plane which is parallel to optical axes of the image pick-up devices and a detection plane including the derived plurality of corresponding points in the stereo images; and a result determination function for determining as there being an obstacle when the slope degree of the detection plane is larger than a predetermined value.

* * * * *

UNITED STATES PATENT AND TRADEMARK OFFICE
CERTIFICATE OF CORRECTION

PATENT NO. : 6,906,620 B2
DATED : June 14, 2005
INVENTOR(S) : Nakai et al.

It is certified that error appears in the above-identified patent and that said Letters Patent is hereby corrected as shown below:

Column 16,
Lines 11-12, change "an obstacles" to -- an obstacle --.

Signed and Sealed this

Thirteenth Day of September, 2005

JON W. DUDAS
*Director of the United States Patent and Trademark Office*